(12) United States Patent
Uryu

(10) Patent No.: US 12,732,014 B2
(45) Date of Patent: Sep. 8, 2026

(54) POWER LOSS PROTECTION CONTROLLER CIRCUIT, POWER LOSS PROTECTION CIRCUIT, AND DATA STORAGE

(71) Applicant: ROHM CO., LTD., Kyoto (JP)

(72) Inventor: Akira Uryu, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 19/272,351

(22) Filed: Jul. 17, 2025

(65) Prior Publication Data

US 2026/0031648 A1 Jan. 29, 2026

(30) Foreign Application Priority Data

Jul. 26, 2024 (JP) ................................ 2024-120976

(51) Int. Cl.
*H02J 9/06* (2006.01)
*H02M 3/155* (2006.01)

(52) U.S. Cl.
CPC ............... *H02J 9/06* (2013.01); *H02M 3/155* (2013.01)

(58) Field of Classification Search
CPC ........ H02J 9/06; H02M 3/155; H02M 1/0096; H02M 1/32; H02M 1/36; H02M 3/158
See application file for complete search history.

(56) References Cited

U.S. PATENT DOCUMENTS

2020/0366183 A1* 11/2020 Lam ........................ H02J 9/061
2020/0409442 A1* 12/2020 Uryu ........................ G05F 1/465
2023/0179075 A1* 6/2023 Uryu ........................ H02M 1/32 323/285

FOREIGN PATENT DOCUMENTS

JP 2021005924 A 1/2021

* cited by examiner

*Primary Examiner* — Rexford N Barnie
*Assistant Examiner* — Thai H Tran
(74) *Attorney, Agent, or Firm* — CANTOR COLBURN LLP

(57) ABSTRACT

A power loss protection controller circuit for receiving an input voltage and supplying an output voltage to a load includes a bidirectional converter and a converter controller, wherein the bidirectional converter includes a bootstrap circuit, a high-side transistor, a low-side transistor, a high-side driver, a low-side driver, and a voltage maintenance circuit provided separately from the bootstrap circuit, and wherein the converter controller includes a feedback circuit, a logic circuit, and a high-side forced-on circuit.

13 Claims, 16 Drawing Sheets

FIG. 1
(Related Art)

Comparative technique

Comparative technique 100
200
210
EFUSE
220
230
236
CP
232
234
M1
M2
D1
240
244
Buck /Boost Control logic
246
242
FB
CTL1
CTL2
S1
S2
VIN
VBUS
BST
VSTR
SW
PGND
VBUS_FB
VSTR_FB
104
106
108
202
204
C1
C2
C3
L1

Step-up mode
Forced-on
Step-down mode
$t_0$
$t_1$
M1
M2
$V_{SW}$
12V
0V
$I_L$
$V_{IN}$
$V_{SYS}$
T1
T2
T3
T4
T5
T6
$V_{TH(PLP)}$
$V_{REF2}$ 100A
200A
230A
236A
LDO
EFUSE
210
220
240
244
Buck
/Boost
Control
logic
246
242
FB
CTL1
CTL2
S1
S2
232
234
M1
M2
D1
VREG
VSW
VBUS
BST
VSTR
SW
PGND
VIN
VBUS_FB
VSTR_FB
104
106
108
202
204
C1
C2
C3
L1
VBST
VSTR
VBUS
VIN 100B
200B
EFUSE
210
220B
250
VIN
104
VBUS
108
VBBIN
BST
VSTR
SW
PGND
106
C1
C2
C3
L1
204
202
230
236
CP
D1
M1
M2
232
234
S1
S2
240
244
Buck /Boost Control logic
246
242
FB
CTL1
CTL2
VBUS_FB
VSTR_FB Basic control
$V_{TH(PLP)} < V_{BUS(REF)}$
Step-up mode
Step-down mode
Forced-on
$V_{SW}$
T3
T6
$V_{BUS}$
$V_{BUS(REF)}$
$V_{TH(PLP)}$
Control example 2
$V_{TH(PLP)} > V_{BUS(REF)}$
Forced-on disabled
$V_{SW}$
T3
$V_{BUS}$
$V_{TH(PLP)}$
$V_{BUS(REF)}$ Step-up mode
Step-down mode
Control example 2
$V_{SW}$
$V_{BUS}$
$V_{TH(PLP)}$
$V_{BUS(REF)}$
$V_0$
Control example 3
$V_{SW}$
$V_{BUS}$
$V_{TH(PLP)}$
$V_1$
$V_0$
$V_{BUS(PLP)}$

POWER LOSS PROTECTION CONTROLLER CIRCUIT, POWER LOSS PROTECTION CIRCUIT, AND DATA STORAGE

CROSS REFERENCE TO RELATED APPLICATION

The present invention claims priority under 35 U.S.C. § 119 to Japanese Patent Application No. 2024-120976, filed Jul. 26, 2024, the entire contents of which are incorporated herein by reference.

TECHNICAL FIELD

The present disclosure relates to a power loss protection circuit.

BACKGROUND

Stable supply of a power supply voltage is essential for electronic components. When a power supply voltage is momentarily interrupted in a storage such as a solid state drive, a hard disk or the like, data stored in the storage may be destroyed or lost. Even after the input voltage is interrupted, the power supply voltage must be maintained for a period during which the load performs a necessary protection process such as data comparison or the like. This function is known as power loss protection or power interruption protection, and is called PLP (Power Loss Protection), PLI (Power Loss Imminent), or PFP (Power Failure Protection) in English.

Figure 1:
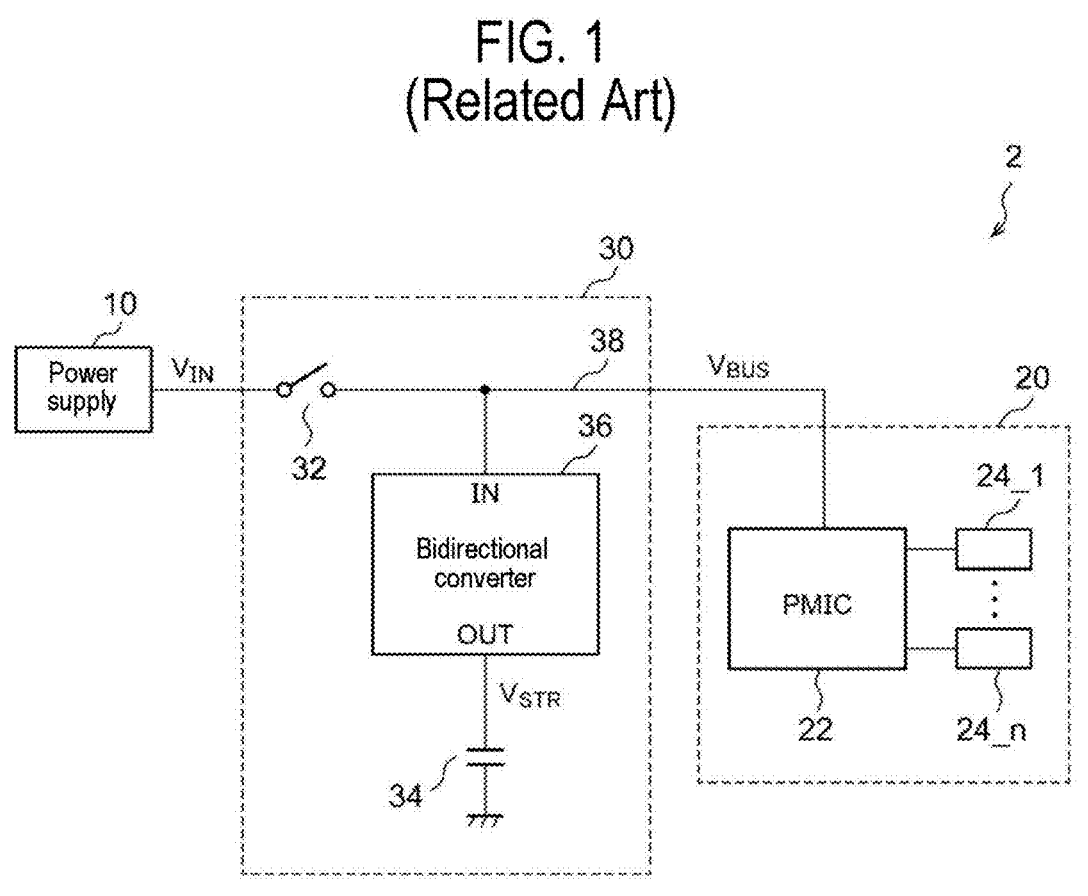

FIG. 1 is a block diagram of a system having a PLP function. The system 2 includes a power supply 10, a load 20, and a power loss protection (PLP) circuit 30. The power supply 10 generates an input voltage $V_{IN}$ of about 12 V. The load 20 includes a PMIC (power management circuit) 22 and a plurality of electronic components 24_1 to 24_*n*. The PMIC 22 receives a power supply voltage $V_{BUS}$ of 12 V, steps up or steps down the power supply voltage, and supplies the power supply voltage to the electronic components 24_1 to 24_*n*.

The PLP circuit 30 is provided between the power supply 10 and the load 20. The PLP circuit 30 includes a switch 32, a backup capacitor 34, and a bidirectional converter 36.

The switch 32 is provided on a power supply line 38 that connects the power supply 10 and the load 20. While a valid input voltage $V_{IN}$ is being supplied, the switch 32 is turned on, and the input voltage $V_{IN}$ is supplied to the load 20 as a power supply voltage $V_{BUS}$. The input terminal IN of the bidirectional converter 36 is connected to the power supply line 38, and the output terminal OUT thereof is connected to the backup capacitor 34. While the input voltage $V_{IN}$ is being supplied, the bidirectional converter 36 steps up the input voltage $V_{IN}$ and charges the backup capacitor 34 (step-up mode). If the capacitance of the backup capacitor 34 is assumed to be C and the voltage generated in the backup capacitor 34 is assumed to be $V_{STR}$, the charge Q and energy E stored in the backup capacitor 34 are expressed by the following formulas.

$$Q = C \cdot V_{STR}$$

$$E = C \cdot V_{STR}^2/2$$

When the PLP circuit 30 detects an interruption (loss) of the input voltage $V_{IN}$, it turns off the switch 32. The bidirectional converter 36 then operates in the reverse direction as a step-down converter in which the OUT side serves as the input and the IN side serves as the output, stepping down the capacitor voltage $V_{STR}$ of the backup capacitor 34 to the voltage level of the power supply voltage $V_{BUS}$ and supplying the capacitor voltage $V_{STR}$ to the load 20 (step-down mode).

In the PLP circuit 30 shown in FIG. 1, there is a delay in switching between the step-up operation of the bidirectional converter 36 at the normal time and the step-down operation of the bidirectional converter 36 at the time of power loss. If this delay is long, the voltage $V_{BUS}$ of the power supply line 38 drops at the time of power loss, and the load 20 becomes inoperable.

BRIEF DESCRIPTION OF DRAWINGS

The accompanying drawings, which are incorporated in and constitute a part of the specification, illustrate embodiments of the present disclosure.

FIG. 1 is a block diagram of a system having a PLP function.

DETAILED DESCRIPTION

Figure 2:
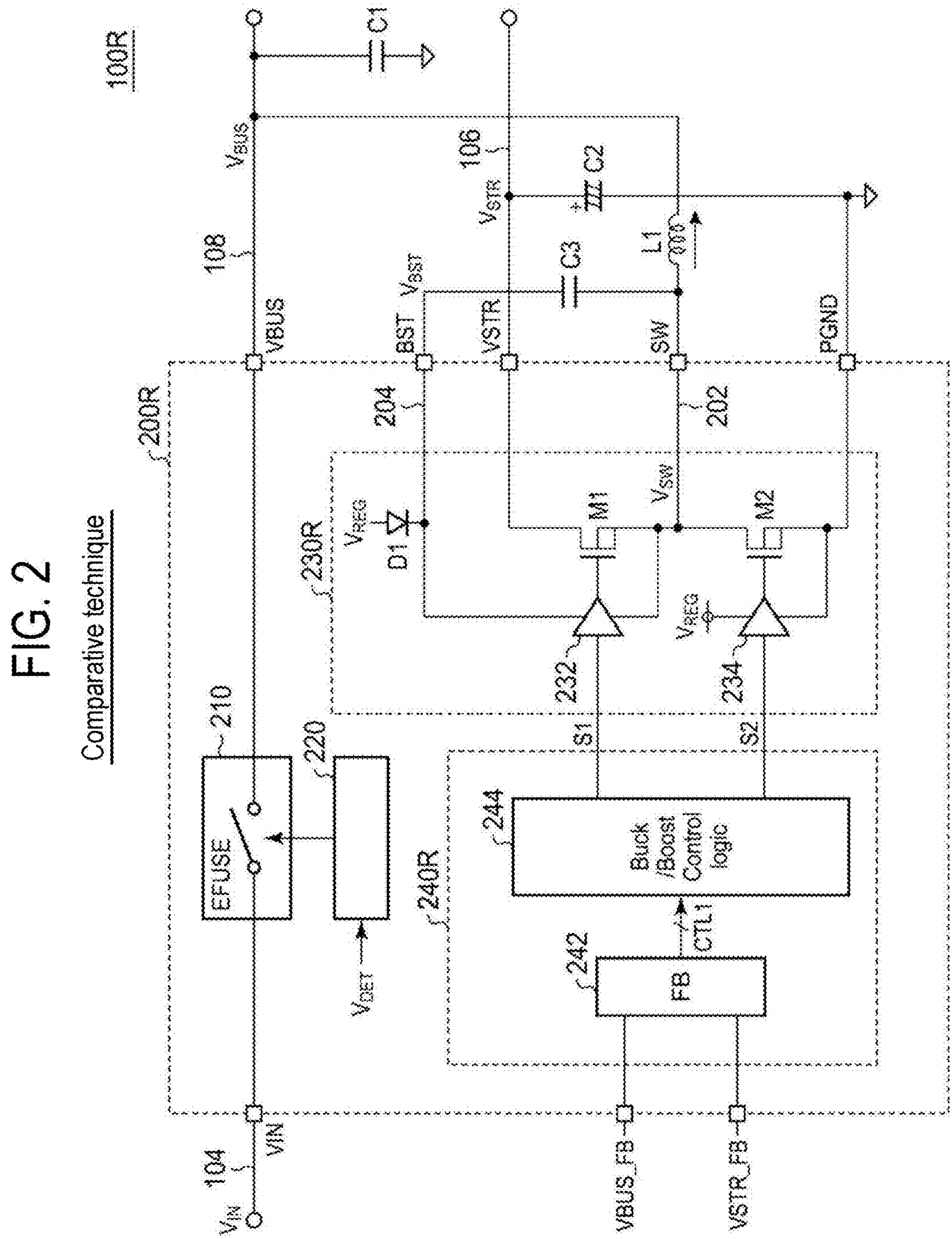
FIG. 2 is a circuit diagram of a PLP circuit according to a comparative technique.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Summary of Embodiments

A summary of some exemplary embodiments of the present disclosure will be described. This summary is intended to provide a simplified description of some concepts of one or more embodiments in order to provide a basic understanding of the embodiments as a prelude to the following detailed description, and is not intended to limit the scope of the invention or the disclosure. Furthermore, this summary is not an exhaustive overview of all conceivable embodiments and is not intended to limit essential components of the embodiments. For the sake of convenience, "one embodiment" may be used to refer to one embodiment (example or modification) or multiple embodiments (examples or modifications) disclosed in this specification.

A power loss protection controller circuit according to an embodiment receives an input voltage and supplies an output voltage to a load. The power loss protection controller circuit includes a bidirectional converter configured to step up the input voltage and charge a backup capacitor in a step-up mode and configured to step down a voltage of the backup capacitor in a step-down mode to generate the output voltage, and a converter controller configured to operate the bidirectional converter in the step-up mode in a normal state in which the input voltage is higher than a predetermined threshold voltage, and configured to operate the bidirectional converter in the step-down mode in a power loss state in which the input voltage is lower than the threshold voltage. The bidirectional converter includes a bootstrap circuit, a high-side transistor, a low-side transistor, a high-side driver configured to drive the high-side transistor, a low-side driver configured to drive the low-side transistor, and a voltage maintenance circuit provided separately from the bootstrap circuit and configured to maintain a voltage of a bootstrap line of the bidirectional converter at a voltage higher than a switching voltage by a predetermined voltage value. The converter controller includes a feedback circuit configured to generate a feedback control signal so that the voltage of the backup capacitor approaches a first target level in the step-up mode, and configured to generate a feedback control signal so that the output voltage approaches a second target level in the step-down mode, a logic circuit configured to control the high-side driver and the low-side driver based on the feedback control signal, and a high-side forced-on circuit configured to control the logic circuit to forcibly fix the high-side transistor to an on state during a high-side forced-on period of a predetermined length when switching from the step-up mode to the step-down mode.

With this configuration, immediately after switching from the step-up mode to the step-down mode due to power loss, the high-side transistor can be fixed to an on state at once based on the output of the high-side forced-on circuit without being affected by the delay of the analog feedback circuit. This makes it possible to suppress a drop in the output voltage.

In one embodiment, the voltage maintenance circuit may include a charge pump circuit.

In one embodiment, the voltage maintenance circuit may include a charging circuit configured to charge the bootstrap line based on the voltage of the backup capacitor.

In one embodiment, the converter controller may control the bidirectional converter so that an on-period of the low-side transistor immediately after the high-side forced on-period docs not become narrower than a predetermined minimum width. This makes it possible to protect the high-side transistor and the low-side transistor.

In one embodiment, the converter controller may disable the forced-on of the high-side transistor when a target level of the output voltage of the bidirectional converter in the step-down mode is lower than the threshold voltage. This makes it possible to prevent the output voltage from changing in a direction opposite to the target level.

In one embodiment, when the converter controller disables the forced-on of the high-side transistor, the converter controller may temporarily shift the target level of the output voltage of the bidirectional converter to a voltage level higher than a normal level immediately after transitioning to the step-down mode. This makes it possible to stabilize the output voltage to the target level in a short period of time.

In one embodiment, the converter controller may have an overcurrent protection function of limiting a current flowing through an inductor of the bidirectional converter so as not to exceed an overcurrent threshold value, and may be configured to increase the overcurrent threshold value over time after switching from the step-up mode to the step-down mode. This makes it possible to suppress overshoot of the output voltage.

In one embodiment, the converter controller may further include a low-side forced-on circuit configured to control the logic circuit to forcibly fix the low-side transistor to an on state during a low-side forced-on period of a predetermined length when switching from the step-down mode to the step-up mode. This makes it possible to suppress undershoot of the voltage of the backup capacitor.

In one embodiment, the converter controller may terminate the low-side forced-on period when a coil current commutates and reaches a predetermined peak current.

In one embodiment, the bidirectional converter may be operated in a synchronous rectification mode in the step-up mode. In one embodiment, the bidirectional converter may be operated in a diode rectification mode in the step-up mode.

In one embodiment, the power loss protection controller circuit may be integrated onto a single semiconductor substrate.

A power loss protection circuit according to an embodiment may include a backup capacitor and any one of the above-described power loss protection controller circuits coupled to the backup capacitor.

A data storage according to an embodiment may include the above-described power loss protection circuit.

Embodiments

Preferred embodiments will be described below with reference to the drawings. The same or equivalent components, parts, and processes shown in each drawing are designated by the same reference numerals, and duplicate descriptions thereof are omitted as appropriate. Furthermore, the embodiments are merely examples that are not intended to limit the present disclosure. All of the features and combinations thereof described in the embodiments are not necessarily essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B. Further, "a state where a member C is provided between a member A and a member B" includes a case where the member A and the member C or the member B and the member C are indirectly connected through any other member that does not affect an electrical connection state between the members A and C or the members B and C or does not impair functions and effects achieved by combinations of the members A and C or the members B and C, in addition to a case where the member A and the member C or the member B and the member C are directly connected.

The technical significance of a PLP circuit according to an embodiment will become apparent when compared with a comparative technique. The comparative technique will be described first.

Comparative Technique

FIG. 2 is a circuit diagram of a PLP circuit 100R according to a comparative technique. The PLP circuit 100R receives an input voltage $V_{IN}$ on an input line 104 and supplies an output voltage (called a bus voltage) $V_{BUS}$ to a load (not shown) connected to an output line 108.

The PLP circuit 100R includes a PLP controller 200R and peripheral circuits thereof. The peripheral circuits may include an output capacitor C1, a backup capacitor C2, a bootstrap capacitor C3, an inductor L1, and the like.

The PLP controller 200R is a functional IC (Integrated Circuit) in which the PLP circuit 100R is integrated on a semiconductor substrate.

An input terminal $V_{IN}$ of the PLP controller 200R is connected to the input line 104 to receive the input voltage $V_{IN}$. An output terminal $V_{BUS}$ of the PLP controller 200R is connected to a load via the output line 108. A storage terminal $V_{STR}$ of the PLP controller 200R is connected to a backup capacitor C2 via a back-up line 106.

The inductor L1 is connected between the switching terminal SW of the PLP controller 200R and the output line 108. In addition, the bootstrap capacitor C3 is connected between the switching terminal SW of the PLP controller 200R and a bootstrap terminal BST.

The PLP controller 200R includes a switch 210, a switch controller 220, a bidirectional converter 230R, and a converter controller 240R.

The switch 210 is also called an electronic fuse and is connected between the input terminal $V_{IN}$ and the output terminal $V_{BUS}$. The switch 210 may be a bidirectional switch.

The switch controller 220 monitors a voltage $V_{DET}$, which is either the input voltage $V_{IN}$ or the output voltage $V_{BUS}$, and determines whether the current state is a normal state or a power loss state. For example, the switch controller 220 may include a voltage comparator that compares the voltage $V_{DET}$ with a PLP threshold value $V_{TH(PLP)}$. The switch controller 220 determines that the current state is the normal state when $V_{DET}>V_{TH(PLP)}$ and determines that the current state is the power loss state when $V_{DET}<V_{TH(PLP)}$. The switch controller 220 turns on the switch 210 in the normal state and turns off the switch 210 in the power loss state.

The bidirectional converter 230R includes a high-side transistor M1, a low-side transistor M2, a diode D1, a high-side driver 232, and a low-side driver 234. The high-side transistor M1 is an N-channel MOSFET (Metal Oxide Semiconductor Field Effect Transistor) and is connected between the storage terminal $V_{STR}$ and the switching terminal SW. The low-side transistor M2 is also an N-channel MOSFET and is connected between the switching terminal SW and a ground terminal PGND.

The high-side driver 232 drives the high-side transistor M1 based on a high-side control signal S1, and the low-side driver 234 drives the low-side transistor M2 based on a low-side control signal S2.

The diode D1 forms a bootstrap circuit together with the bootstrap capacitor C3. The cathode of the diode D1 is connected to the bootstrap terminal BST via the bootstrap line 204. A constant voltage $V_{REG}$ is supplied to the anode of the diode D1. The bootstrap voltage $V_{BST}$ generated on the bootstrap line 204 is maintained at $V_{SW}+V_{REG}-Vf$ by the bootstrap circuit during the switching operation of the bidirectional converter 230R. The bootstrap voltage $V_{BST}$ is supplied to the high-side driver 232 as a gate high voltage of the high-side transistor M1. Vf is the forward voltage of the diode D1. A synchronous switch that is controlled in synchronization with the switching of the bidirectional converter 230R may be provided instead of the diode D1.

In the normal state, the converter controller 240R operates the bidirectional converter 230R in the step-up (boost) mode. Specifically, the high-side transistor M1 and the low-side transistor M2 are feedback-controlled so that the voltage (called a capacitor voltage) $V_{STR}$ of the backup capacitor C2 is stabilized to a predetermined target voltage $V_{STR(REF)}$ (e.g., 30 V). As a result, the output voltage $V_{BUS}$ is stepped up and the power is stored in the backup capacitor C2. In the step-up mode, the bidirectional converter 230R may operate in the synchronous rectification mode in which the high-side transistor M1 and the low-side transistor M2 are switched complementarily. Alternatively, the bidirectional converter 230R may operate in the diode rectification mode in which the high-side transistor M1 is fixed to an off state.

In the power loss state, the converter controller 240R operates the bidirectional converter 230R in the step-down (buck) mode. Thus, the voltage $V_{STR}$ of the backup capacitor C2 is stepped down, and the output voltage $V_{BUS}$ is generated. Specifically, the high-side transistor M1 and the low-side transistor M2 are feedback-controlled so that the output voltage $V_{BUS}$ is stabilized to the predetermined target voltage $V_{BUS(REF)}$ (e.g., 12 V).

The converter controller 240R includes a feedback circuit 242 configured by an analog circuit, and a logic circuit 244.

The feedback circuit 242 receives a feedback voltage $V_{BUS}$ FB corresponding to the bus voltage $V_{BUS}$ and a feedback voltage $V_{STR}$ FB corresponding to the capacitor voltage $V_{STR}$.

The feedback circuit 242 generates a feedback control signal CTL1 so that the capacitor voltage $V_{STR}$ approaches a first target level $V_{STR(REF)}$ in the step-up mode, and generates a feedback control signal CTL1 so that the output voltage $V_{BUS}$ approaches a second target level $V_{BUS(REF)}$ in the step-down mode. The feedback circuit 242 includes analog circuits such as an error amplifier and a voltage comparator. The feedback control signal CTL1 may include a timing signal that triggers the turn-on and turn-off of the high-side transistor M1 and the low-side transistor M2, a pulse signal that specifies the on-time and off-time, and the like.

The circuit configuration of the feedback circuit 242 is not particularly limited, and the feedback circuit 242 may be configured using a known technique.

The logic circuit 244 generates a high-side control signal S1 and a low-side control signal S2 based on the feedback control signal CTL1 to control the high-side driver 232 and the low-side driver 234.

The configuration of the PLP controller 200R has been described above.

Next, an operation thereof will be described.

Figure 3:
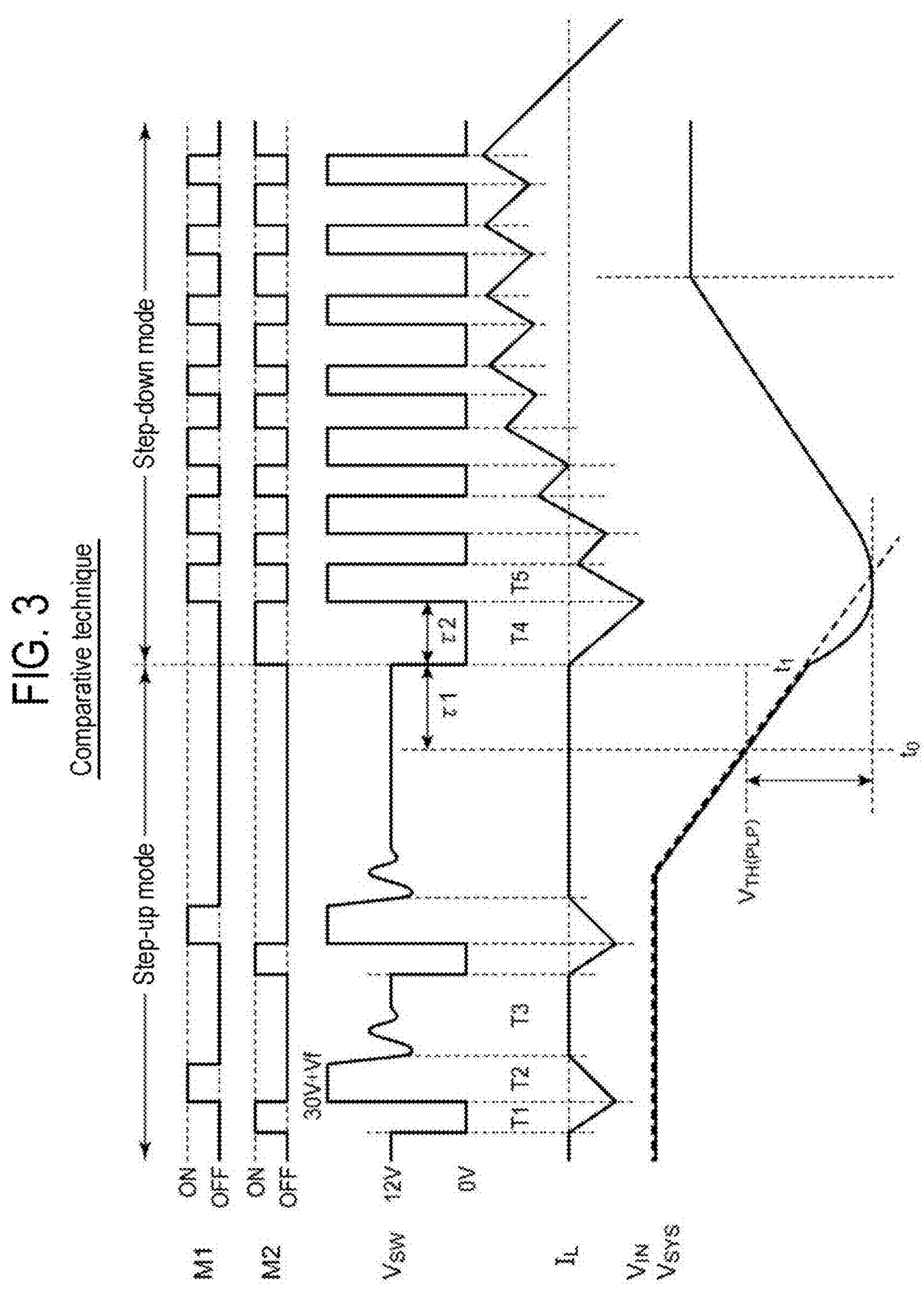
FIG. 3 is a waveform diagram for explaining an operation of the PLP controller shown in FIG. 2.

FIG. 3 is a waveform diagram for explaining the operation of the PLP controller 200R shown in FIG. 2. Before time $t_0$, the state is a normal state, and the input voltage $V_{IN}$ higher than the threshold voltage $V_{TH(PLP)}$ is supplied.

The input voltage $V_{IN}$ is assumed to be 12 V. In the normal state, the bidirectional converter 230R operates in the step-up mode. FIG. 3 shows a state in which charging of the backup capacitor C2 is completed. The capacitor voltage $V_{STR}$ is stabilized at $V_{STR(REF)}$=30 V. In this state, the bidirectional converter 230R is in a light load state and is operated in a pulse frequency modulation (PFM) mode. That is, a period T1 in which the low-side transistor M2 is turned on and the high-side transistor M1 is turned off, a period T2 in which the low-side transistor M2 is turned off and the high-side transistor M1 is turned on, and a high impedance period T3 in which both the high-side transistor M1 and the low-side transistor M2 are turned off are repeated. In the period T1, the switching voltage $V_{SW}$ is 0 V, and in the period T2, the switching voltage $V_{SW}$ is the voltage $V_{STR}$ of the backup capacitor C2. In the period T3, the switching voltage $V_{SW}$ is the input voltage $V_{IN}$=12 V.

At time $t_0$, the input voltage $V_{IN}$ becomes lower than the threshold voltage $V_{TH(PLP)}$. Ideally, switching control in the step-down mode should start immediately at time $t_0$. However, since the feedback circuit 242 of the converter controller 240 has a delay due to an error amplifier or the like, switching in the step-down mode occurs at time $t_1$, which is a certain time $\tau_1$ later than time $t_0$. During this delay time $\tau_1$, the output voltage $V_{BUS}$ decreases and becomes lower than the threshold voltage $V_{TH(PLP)}$.

At time $t_1$, switching in the step-down mode starts. In the step-down mode, a period T4 in which the low-side transistor M2 is turned on and the high-side transistor M1 is turned off and a period T5 in which the low-side transistor M2 is turned off and the high-side transistor M1 is turned on occur alternately.

In the period T4 (indicated by $\tau_2$ in FIG. 3) immediately after time $t_1$, the coil current $I_L$ is negative. That is, since the charge is discharged from the output capacitor C1, the output voltage $V_{BUS}$ further decreases.

In other words, in the comparative technique, after the output voltage $V_{BUS}$ drops below the threshold voltage $V_{TH(PLP)}$ of the PLP, it continues to drop in the two periods $\tau_1$ and $\tau_2$. Thus, the operation of the load to which the output voltage $V_{BUS}$ is supplied may become unstable.

The operation of the PLP controller 200R has been described above. Next, the PLP controller 200 according to an embodiment will be described.

Embodiment

Figure 4:
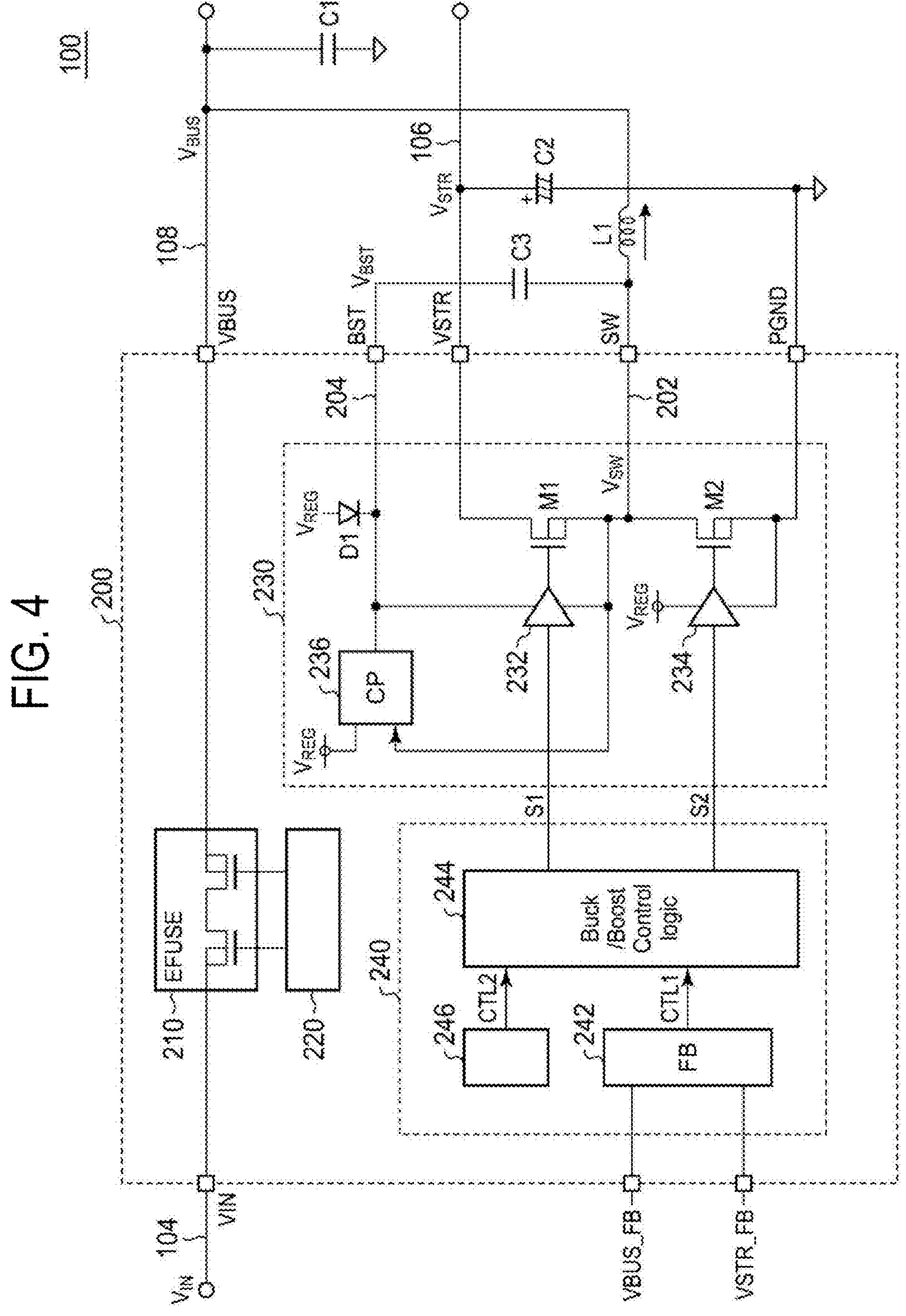
FIG. 4 is a circuit diagram of a PLP circuit according to an embodiment.

FIG. 4 is a circuit diagram of a PLP circuit 100 according to an embodiment. The switch 210 is a bidirectional switch and may include two N-channel MOSFETs connected in anti-series.

In the present embodiment, the bidirectional converter 230 is provided with a voltage maintenance circuit 236. The bootstrap circuit does not operate unless the bidirectional converter 230 is switching. Therefore, the potential difference between the bootstrap line 204 and the switching line 202 cannot be appropriately maintained in a state in which switching is stopped.

The voltage maintenance circuit 236 is provided separately from the bootstrap circuit. The voltage maintenance circuit 236 maintains the voltage $V_{BST}$ of the bootstrap line 204 of the bidirectional converter 230 at a voltage $V_{SW}+\Delta V$ that is higher than the switching voltage $V_{SW}$ by a predetermined voltage value $\Delta V$. In other words, the voltage difference between the bootstrap line 204 and the switching line 202 is maintained at a constant value $\Delta V$.

The voltage maintenance circuit 236 may be a charge pump circuit that adds a constant voltage $V_{REG}$ to the switching voltage $V_{SW}$.

Figure 5:
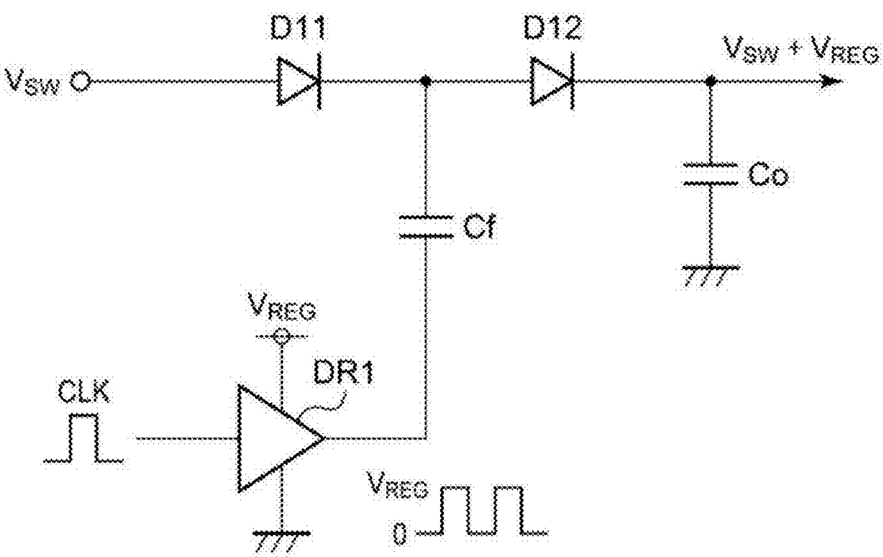
FIG. 5 is a circuit diagram of a voltage maintenance circuit according to one embodiment.

FIG. 5 is a circuit diagram of a voltage maintenance circuit 236A according to an embodiment. The voltage maintenance circuit 236A is a charge pump circuit. The type of the charge pump circuit is not particularly limited. The charge pump circuit includes, for example, a flying capacitor Cf, rectifying elements D11 and D12, and a driver circuit DR1. The driver circuit DR1 receives a clock signal CLK and supplies a pulse signal having a constant voltage $V_{REG}$ as an amplitude to one end of the flying capacitor Cf. The other end of the flying capacitor Cf is supplied with a switching voltage $V_{SW}$, which is an input voltage, via the rectifying element D11. The other end of the flying capacitor Cf is connected to an output capacitor Co via the rectifying element D12. The output capacitor Co may be a bootstrap capacitor C3.

Further, although the rectifying elements D11 and D12 are diodes in this example, the rectifying elements D11 and D12 may be configured by transistors instead. The topology of the charge pump circuit is not limited to that shown in FIG. 5, and may be configured using a known or future available technique.

Returning to FIG. 4, by adding the voltage maintenance circuit 236, the bootstrap voltage $V_{BST}$ is always maintained at a voltage higher than the switching voltage $V_{SW}$ by a predetermined voltage value $\Delta V$, regardless of the operation mode of the bidirectional converter 230. This makes it possible to apply a gate high voltage higher than a gate threshold voltage $V_{GS(th)}$ to between the gate and source of the high-side transistor M1.

The converter controller 240 is provided with a high-side forced-on circuit 246 in addition to the feedback circuit 242 and the logic circuit 244.

When switching from the step-up mode to the step-down mode, the high-side forced-on circuit 246 generates a high-side forced-on signal CTL2 and controls the logic circuit 244 to forcibly fix the high-side transistor M1 to an on state during a high-side forced-on period of a predetermined length. During the forced-on period, the logic circuit 244 fixes the low-side transistor M2 to an off state.

The configuration of the PLP circuit 100 has been described above. Next, an operation of the PLP circuit 100 will be described.

Figure 6:
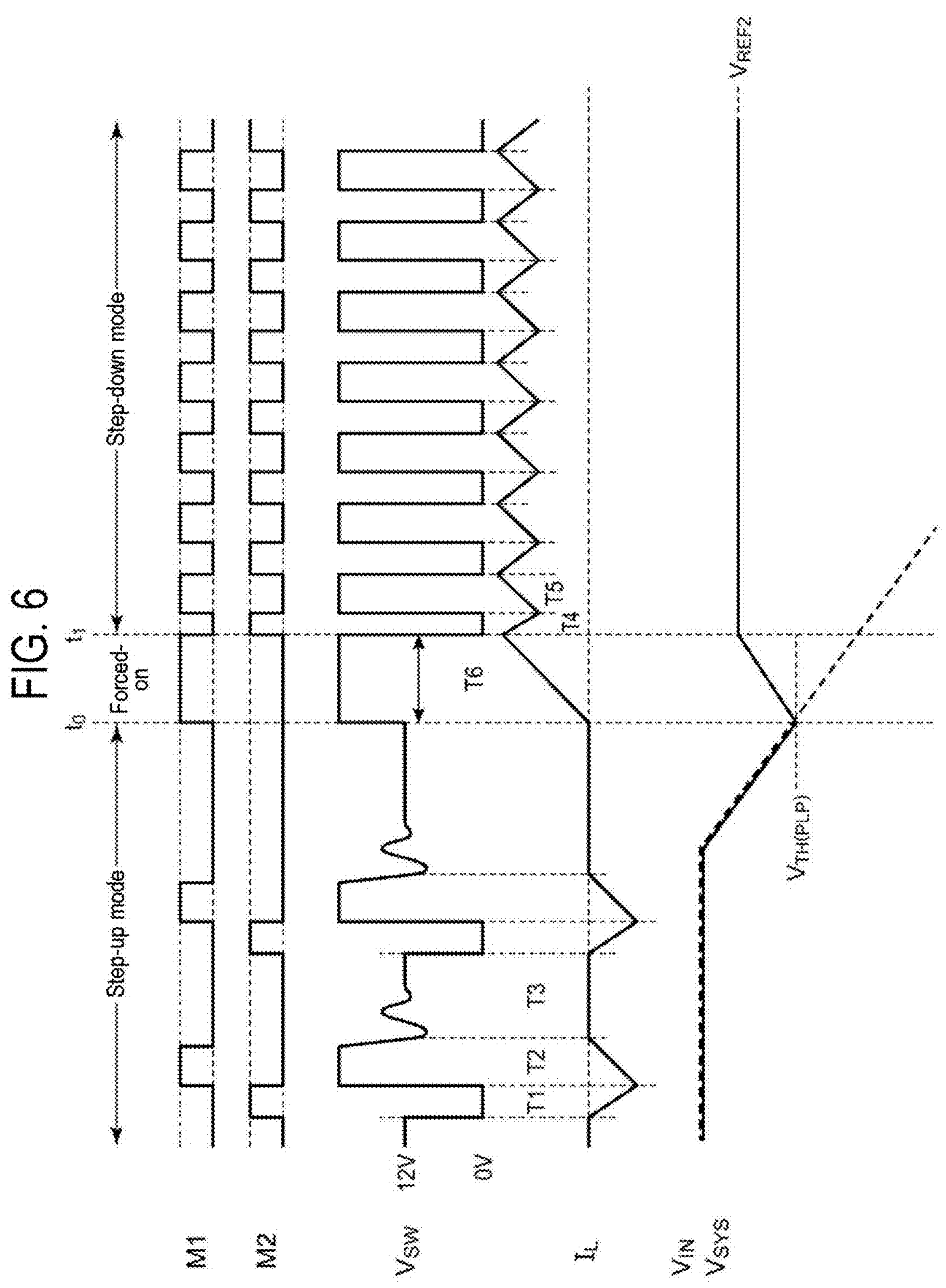
FIG. 6 is a waveform diagram for explaining an operation of the PLP circuit shown in FIG. 4.

FIG. 6 is a waveform diagram for explaining the operation of the PLP circuit 100 shown in FIG. 4. Before time $t_0$, the state is a normal state, and the input voltage $V_{IN}$ higher than the threshold voltage $V_{TH(PLP)}$ is supplied.

In the normal state, the bidirectional converter 230 is operated in a pulse frequency modulation (PFM) mode. A period T1 in which the low-side transistor M2 is turned on and the high-side transistor M1 is turned off, a period T2 in which the low-side transistor M2 is turned off and the high-side transistor M1 is turned on, and a high impedance period T3 in which both the high-side transistor M1 and the low-side transistor M2 are turned off are repeated.

When the input voltage $V_{IN}$ becomes lower than the threshold voltage $V_{TH(PLP)}$ at time $t_0$, the power loss protection state is entered and the switch 210 is turned off. In addition, the bidirectional converter 230 is switched from the step-up mode to the step-down mode.

When switching from the step-up mode to the step-down mode, regardless of the feedback signal CTL1 generated by the feedback circuit 242, the logic circuit 244 responds to the high-side forced-on signal CTL2 generated by the high-side forced-on circuit 246 to forcibly fix the high-side transistor M1 to an on state and forcibly fix the low-side transistor M2 to an off state during a high-side forced-on period T6 of a predetermined length.

Since the voltage $V_{BST}$ of the bootstrap line 204 is maintained at a voltage level higher than the switching voltage $V_{SW}$ by the voltage maintenance circuit 236, at time $t_0$, the high-side driver 232 can turn on the high-side transistor M1.

After the high-side forced-on period T6 ends, the logic circuit 244 operates the bidirectional converter 230 in the step-down mode based on the feedback signal CTL1 generated by the feedback circuit 242. In the step-down mode, the periods T4 and T5 are alternately repeated.

The operation of the PLP circuit 100 has been described above.

In this PLP circuit 100, when a voltage loss state is detected at time $t_0$, regardless of the state of the feedback circuit 242 of the converter controller 240, the high-side transistor M1 is forcibly fixed to an on state and the low-side transistor M2 is forcibly fixed to an off state at time $t_0$ by digital control using the high-side forced-on circuit 246. This makes it possible to reduce the influence of the delay ($\tau_1$ in FIG. 3) of the analog circuit, and to suppress a drop in the output voltage $V_{BUS}$.

During the high-side forced-on period T6 immediately after switching from the step-up mode to the step-down mode, the high-side transistor M1 is turned on and the low-side transistor M2 is turned off, so that the coil current $I_L$ flows in a direction in which the output capacitor C1 is charged. This makes it possible to increase the output voltage $V_{BUS}$ and suppress a decrease in the output voltage $V_{BUS}$ compared to the comparative technique.

Next, modifications of the PLP circuit 100 will be described.

Modification 1

Figure 7:
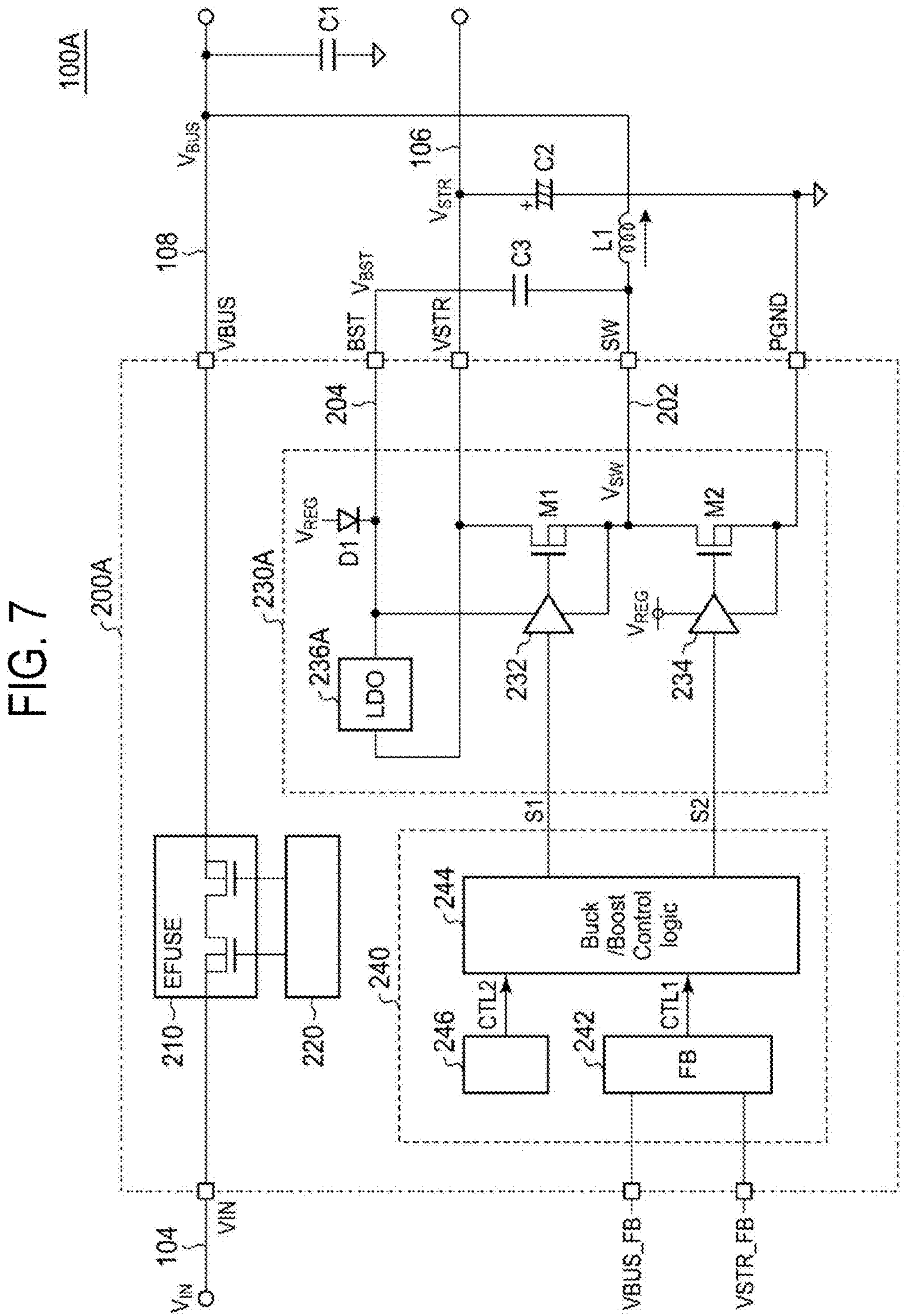
FIG. 7 is a circuit diagram of a PLP circuit according to modification 1.

FIG. 7 is a circuit diagram of a PLP circuit 100A according to modification 1. In this modification, the voltage maintenance circuit 236A includes a charging circuit that receives the voltage $V_{STR}$ of the backup capacitor C2 as an input voltage. This charging circuit is, for example, a linear regulator circuit (LDO: Low Drop Output), and the reference voltage may be determined according to the switching voltage $V_{SW}$. Since the capacitor voltage $V_{STR}$ is higher than the output voltage $V_{BUS}$, the voltage $V_{BST}$ of the bootstrap line 204 can be stabilized to an appropriate voltage level higher than the switching voltage $V_{SW}$ by a predetermined voltage without having to use the charge pump circuit.

Modification 2

Figure 8:
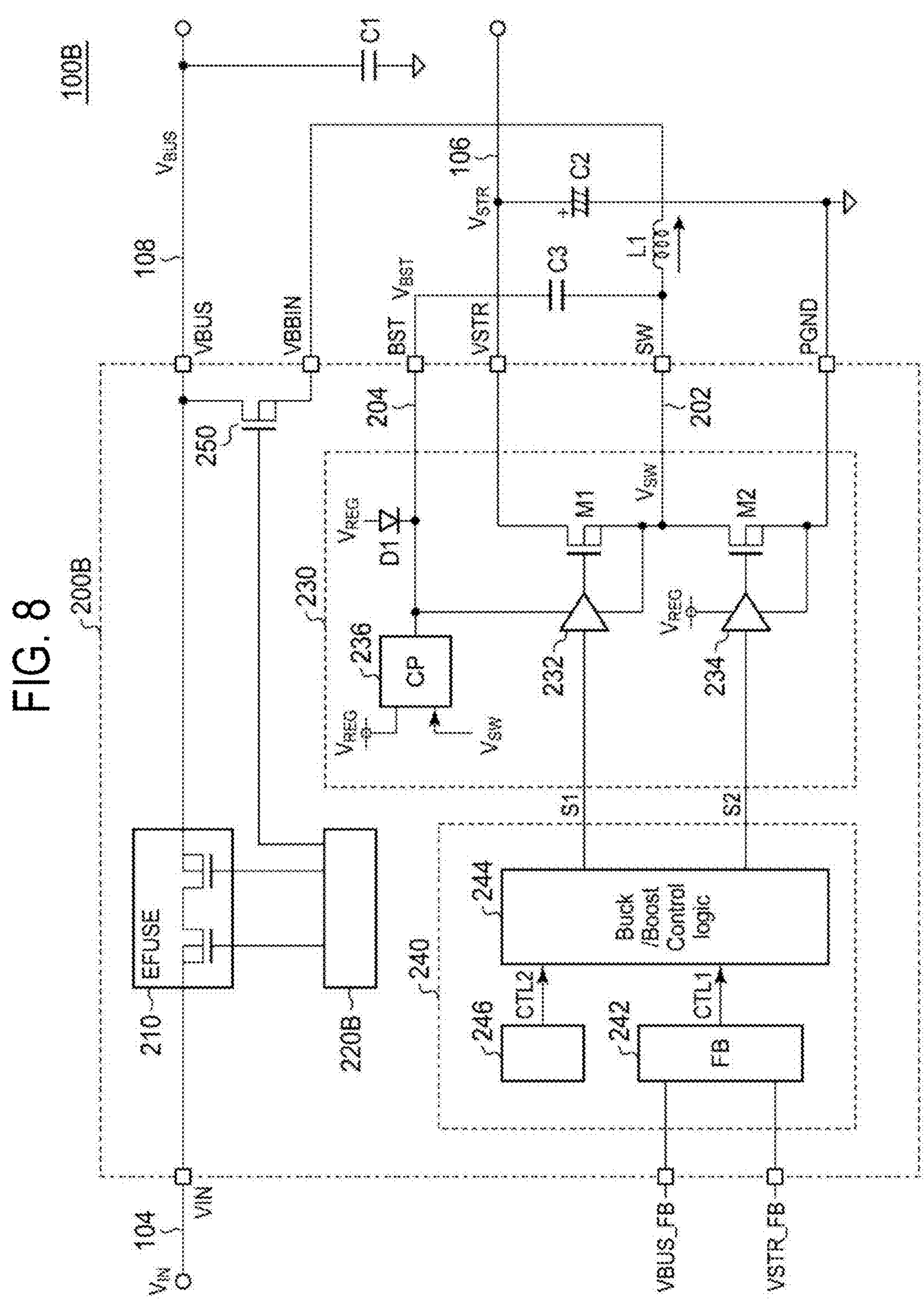
FIG. 8 is a circuit diagram of a PLP circuit according to modification 2.

FIG. 8 is a circuit diagram of a PLP circuit 100B according to modification 2. In this modification, the PLP controller 200B further includes a blocking transistor (FET) 250. A blocking input terminal VBBIN of the PLP controller 200B is connected to the inductor L1. The blocking transistor 250 is provided between the blocking input terminal VBBIN and the output terminal $V_{BUS}$.

In the configuration shown in FIG. 4, when the input voltage $V_{IN}$ rises upon startup of the PLP controller 200B, the back-up line 106 is charged via a charging path including the switch 210, the inductor L1, and the high-side transistor M1. If the impedance of this charging path is too low, an inrush current may flow.

The blocking transistor 250 is inserted to prevent an inrush current from flowing into the backup capacitor C2. At start-up, the switch controller 220B gradually reduces the on-resistance of the blocking transistor 250 over time.

The switch 210 may have the function of the blocking transistor 250. That is, at startup, the switch controller 220 may gradually reduce the on-resistance of the switch 210 over time. In this case, the rising speed of the output voltage $V_{BUS}$ at startup becomes slower, but the blocking transistor 250 is not necessary.

Next, more preferable control of the bidirectional converter 230 by the converter controller 240 will be described.

Control Example 1

Figure 9:
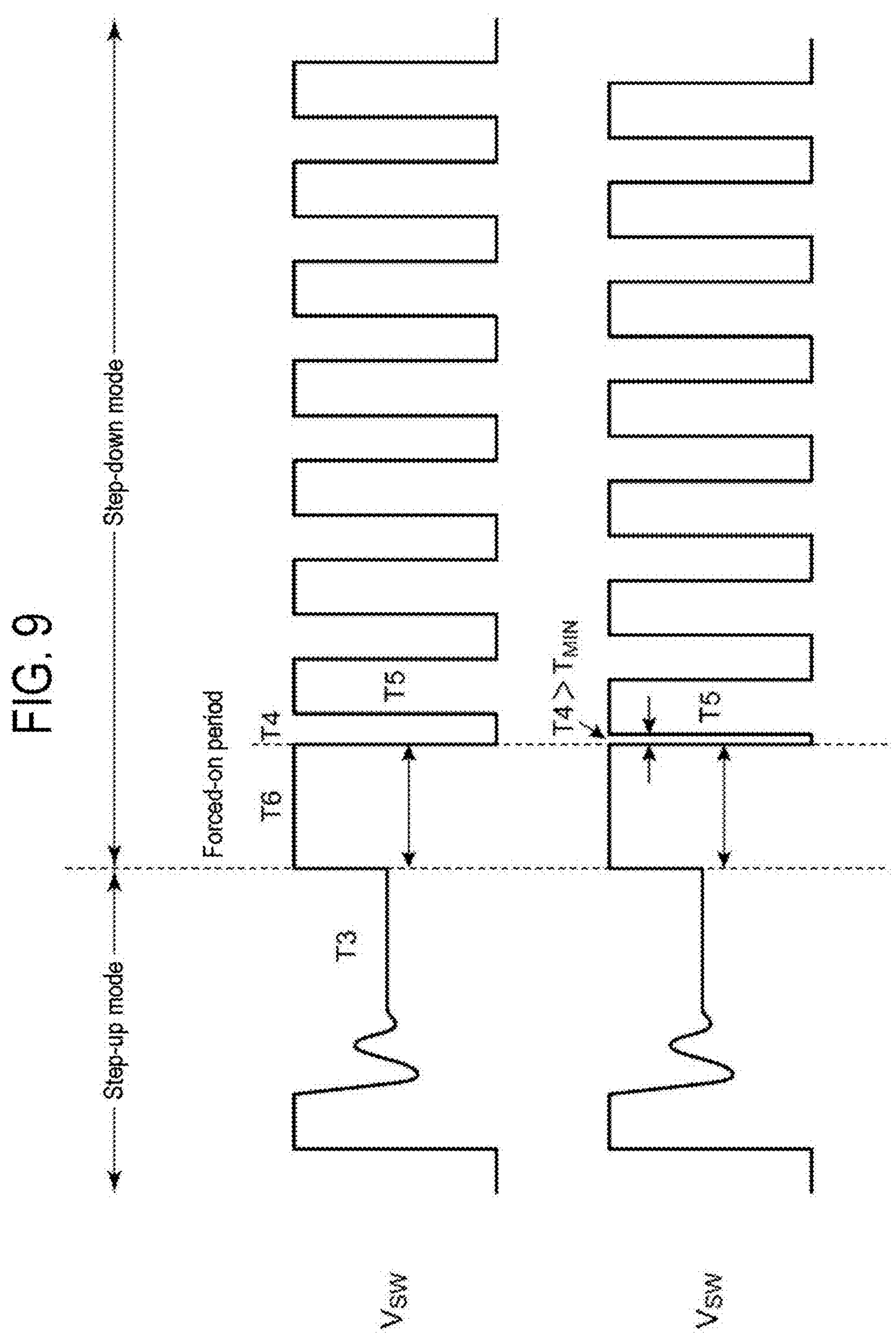
FIG. 9 is a diagram for explaining control example 1.

FIG. 9 is a diagram for explaining control example 1. Depending on the operating state of the PLP circuit 100, the on-period T4 of the low-side transistor M2 immediately after the high-side forced-on period T6 may become very short. If the on-period T4 of the low-side transistor M2 is too short, stress may be applied to the high-side transistor M1 and the low-side transistor M2, which may reduce reliability.

Therefore, the converter controller 240 generates the control signals S1 and S2 so that the on-period T4 immediately after the high-side forced-on period T6 is not narrower than a predetermined minimum width $T_{MIN}$. The minimum width $T_{MIN}$ may be set to, for example, several hundred ns, specifically, about 100 ns to 500 ns, and more specifically, about 250 ns.

This makes it possible to prevent the reliability of the high-side transistor M1 and the low-side transistor M2 from decreasing.

Control Example 2

Figure 10:
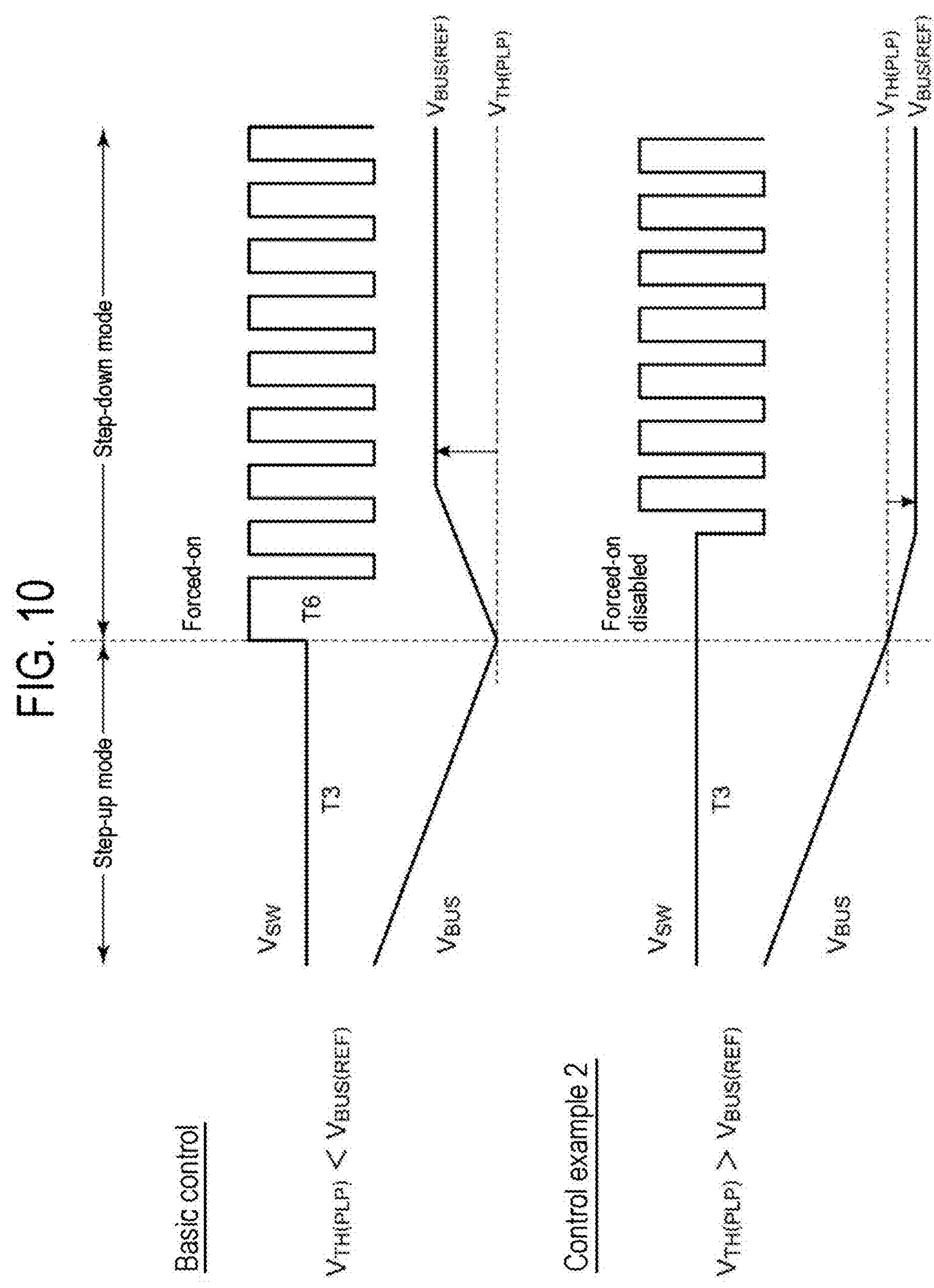
FIG. 10 is a diagram for explaining control example 2.

FIG. 10 is a diagram for explaining control example 2. In the description made so far, there has been described the case where the target level $V_{BUS(REF)}$ of the bus voltage $V_{BUS}$ in the step-down mode is higher than the threshold voltage $V_{TH(PLP)}$ of the PLP ($V_{BUS(REF)}>V_{TH(PLP)}$. This is called basic control.

If the threshold voltage $V_{TH(PLP)}$ of the PLP and the target level $V_{BUS(REF)}$ of the output voltage $V_{BUS}$ in the step-down mode can be freely set by the user, there may be a case where $V_{BUS(REF)}<V_{TH(PLP)}$.

In a situation where $V_{BUS(REF)}<V_{TH(PLP)}$, if a high-side forced-on period T6 is provided when transitioning from the step-up mode to the step-down mode, the bus voltage $V_{BUS}$ rises in the high-side forced-on period T6 and moves away from the target level $V_{BUS(REF)}$, and the convergence to the target level $V_{BUS(REF)}$ is delayed.

In control example 2, when $V_{BUS(REF)}<V_{TH(PLP)}$, the logic circuit 244 disables the forced-on of the high-side transistor M1 and performs the step-down mode operation based on the output CTL1 of the feedback circuit 242. This allows the bus voltage $V_{BUS}$ to approach the target level $V_{BUS(REF)}$ in a short period of time.

Control Example 3

Figure 11:
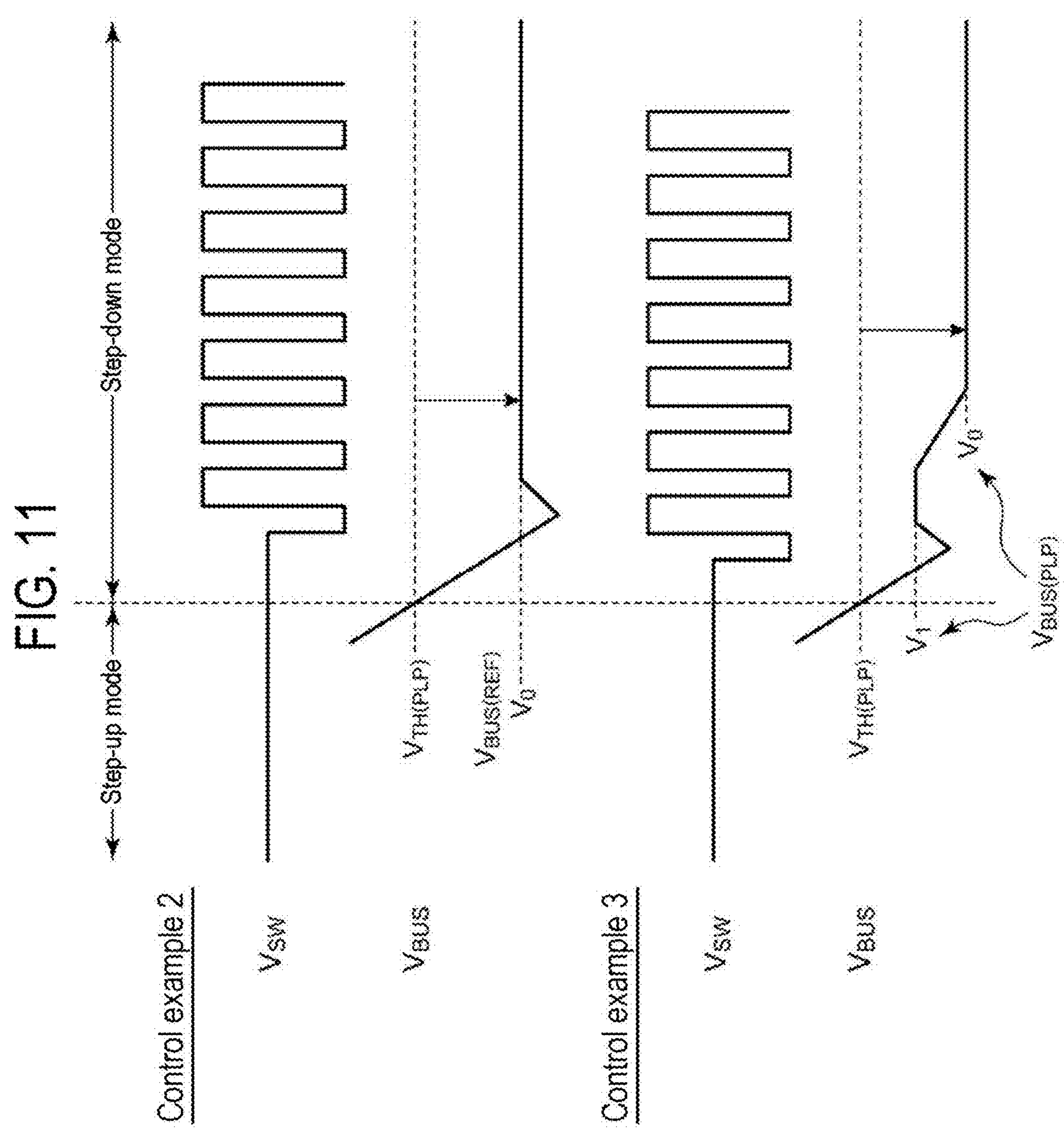
FIG. 11 is a diagram for explaining control example 3.

FIG. 11 is a diagram for explaining control example 3. Control example 3 is an improvement of control example 2. FIG. 11 shows a comparison of the operation of control example 2 and the operation of control example 3. In control example 2, when $V_{BUS(REF)}<V_{TH(PLP)}$, the forced-on of the high-side transistor M1 is disabled. The target level $V_{BUS(REF)}$ of the bidirectional converter 230 in the step-down mode is a constant level $V_0$. In this case, there is a possibility that an undershoot will occur in which the bus voltage $V_{BUS}$ becomes lower than the target level $V_{BUS(REF)}$.

In control example 3, immediately after switching to the step-down mode, the target level $V_{BUS(REF)}$ of the bidirectional converter 230 in the step-down mode is temporarily shifted to a level $V_1$ that is slightly higher than the true level $V_0$, and then the target level $V_{BUS(REF)}$ is returned to the true level $V_0$. This makes it possible to suppress undershoot in which the bus voltage $V_{BUS}$ becomes lower than the true level $V_0$ of the target level $V_{BUS(REF)}$.

Control Example 4

Figure 12:
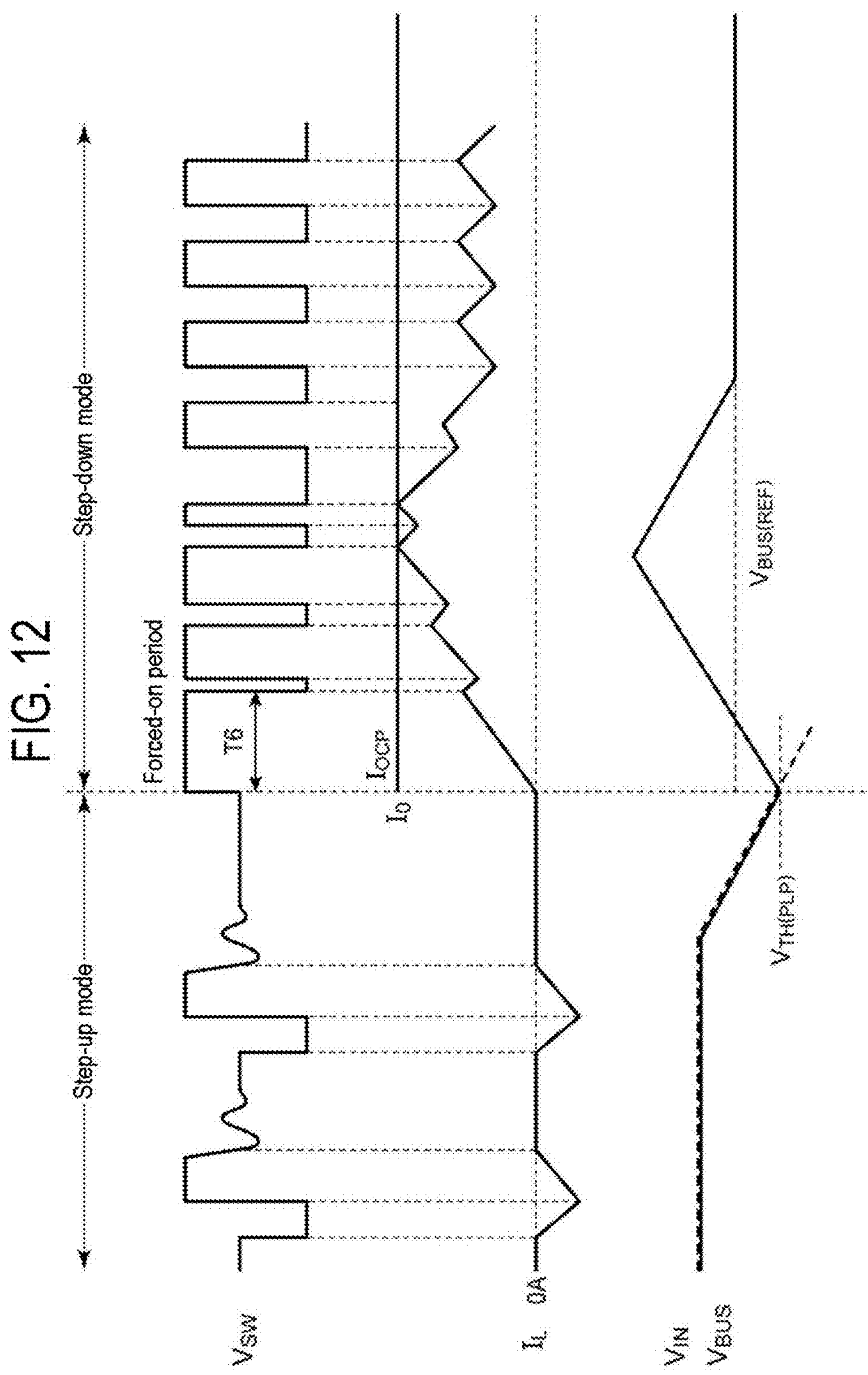
FIG. 12 is a diagram for explaining a separate problem that arises in basic control.

FIG. 12 is a diagram for explaining a separate problem that arises in the basic control. The feedback circuit 242 has an overcurrent protection function, and in the step-down mode, controls the switching of the bidirectional converter 230 so that the coil current $I_L$ does not exceed an overcurrent protection threshold value $I_{OCP}$.

At this time, if the threshold value $I_{OCP}$ is a constant level $I_0$, immediately after the high-side forced-on period T6, the coil current $I_L$ rises to the threshold value $I_{OCP}=I_0$, and a large current is supplied to the output capacitor C1. As a result, there is a risk of the bus voltage $V_{BUS}$ overshooting beyond the target level $V_{BUS(REF)}$.

Figure 13:
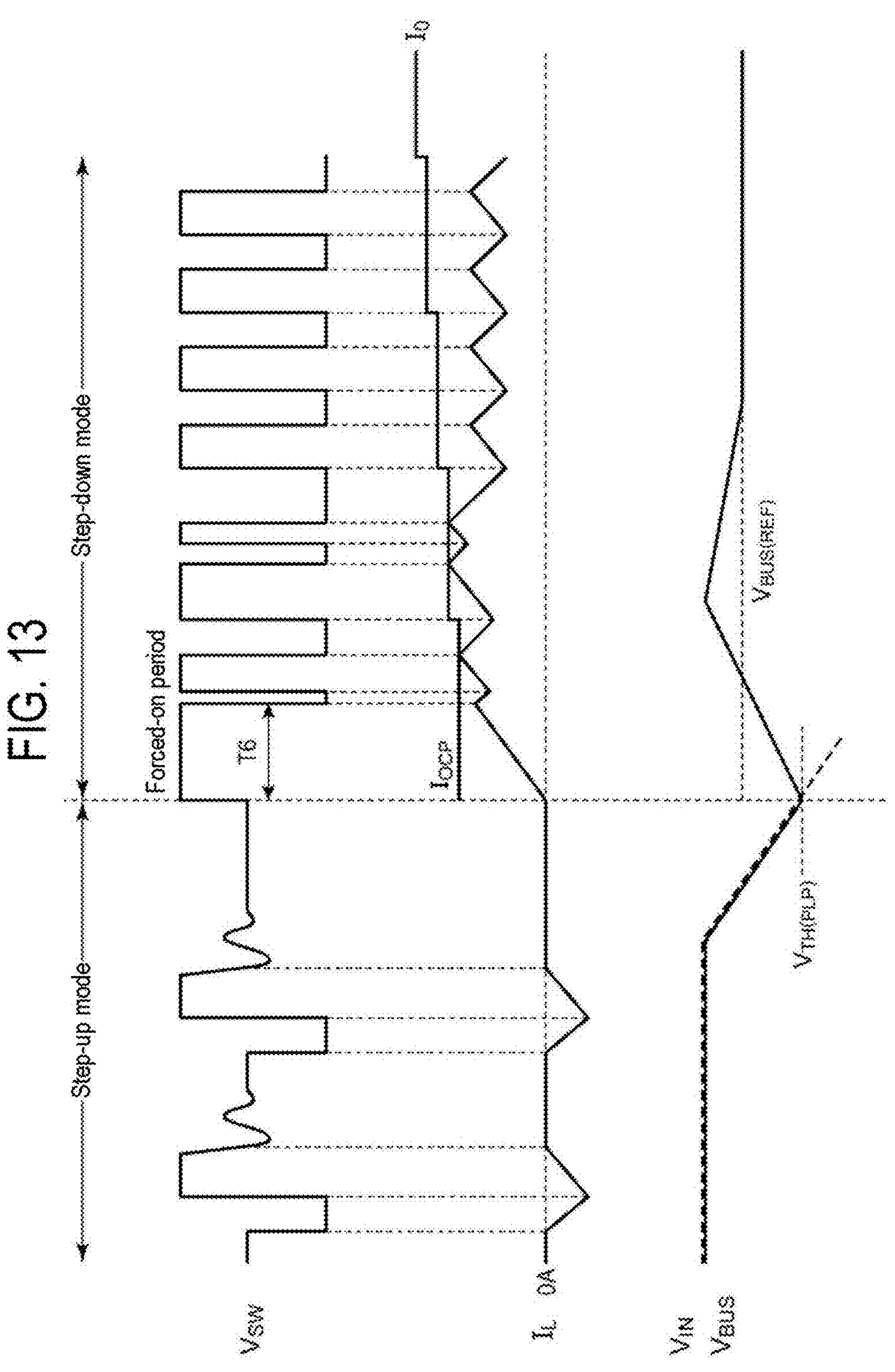
FIG. 13 is a diagram for explaining control example 4.

FIG. 13 is a diagram for explaining control example 4. In control example 4, after transition from the step-up mode to the step-down mode, the feedback circuit 242 gradually increases the overcurrent threshold value $I_{OCP}$. As a result, immediately after the high-side forced-on period T6, the coil current $I_L$ is clamped at a small threshold value $I_{OCP}$, so that the current supplied to the output capacitor C1 can be suppressed and the amount of overshoot of the bus voltage $V_{BUS}$ can be reduced.

Next, a further modification of the PLP circuit 100 will be described.

Modification 3

Figure 14:
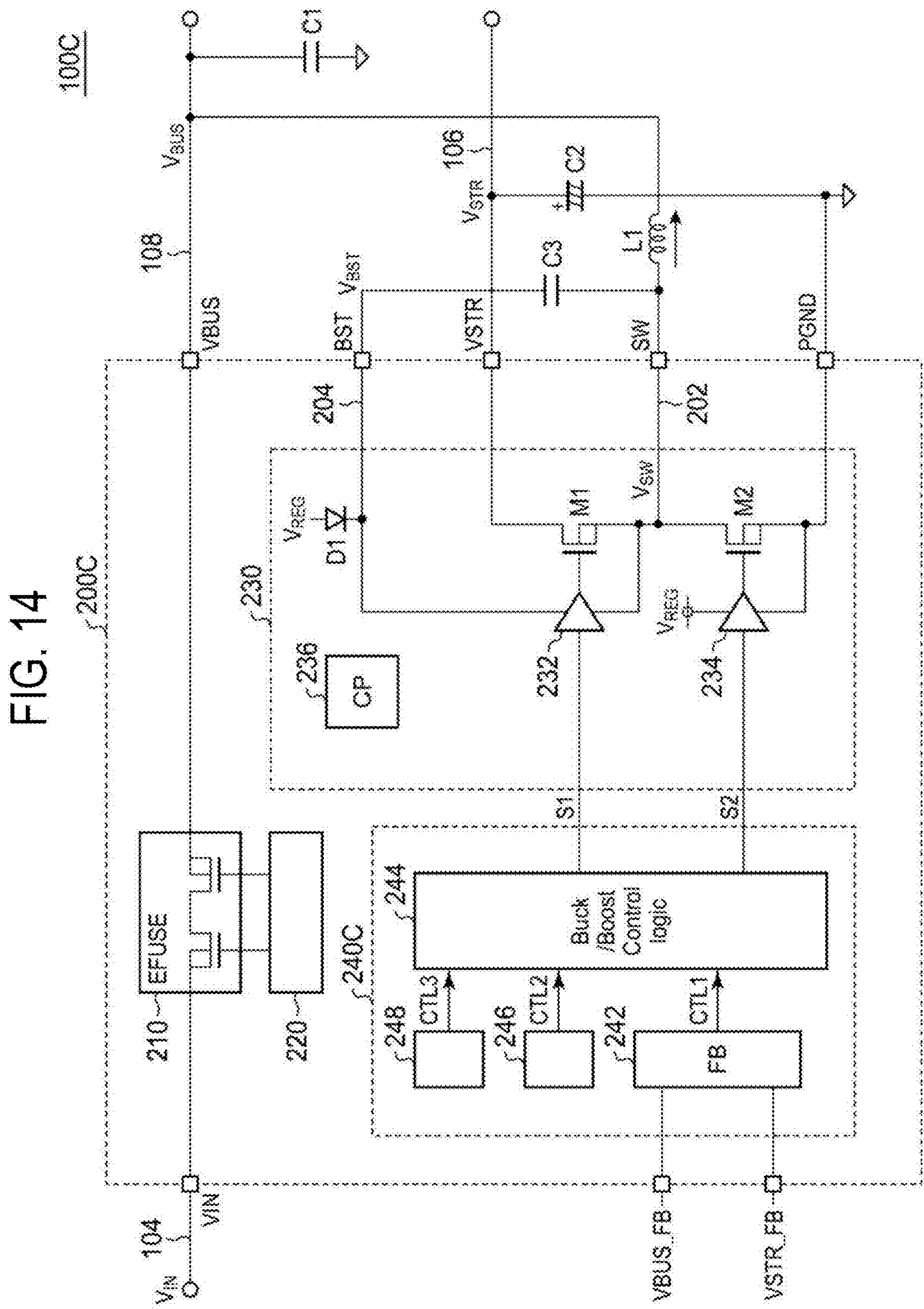
FIG. 14 is a circuit diagram of a PLP circuit according to modification 3.

FIG. 14 is a circuit diagram of a PLP circuit 100C according to modification 3. The converter controller 240C is provided with a low-side forced-on circuit 248.

When switching from the step-down mode to the step-up mode, the low-side forced-on circuit 248 generates a low-side forced-on signal CTL3 and controls the logic circuit 244 to forcibly fix the low-side transistor M2 to an on state. During this low-side forced-on period, the logic circuit 244 fixes the high-side transistor M1 to an off state.

Figure 15:
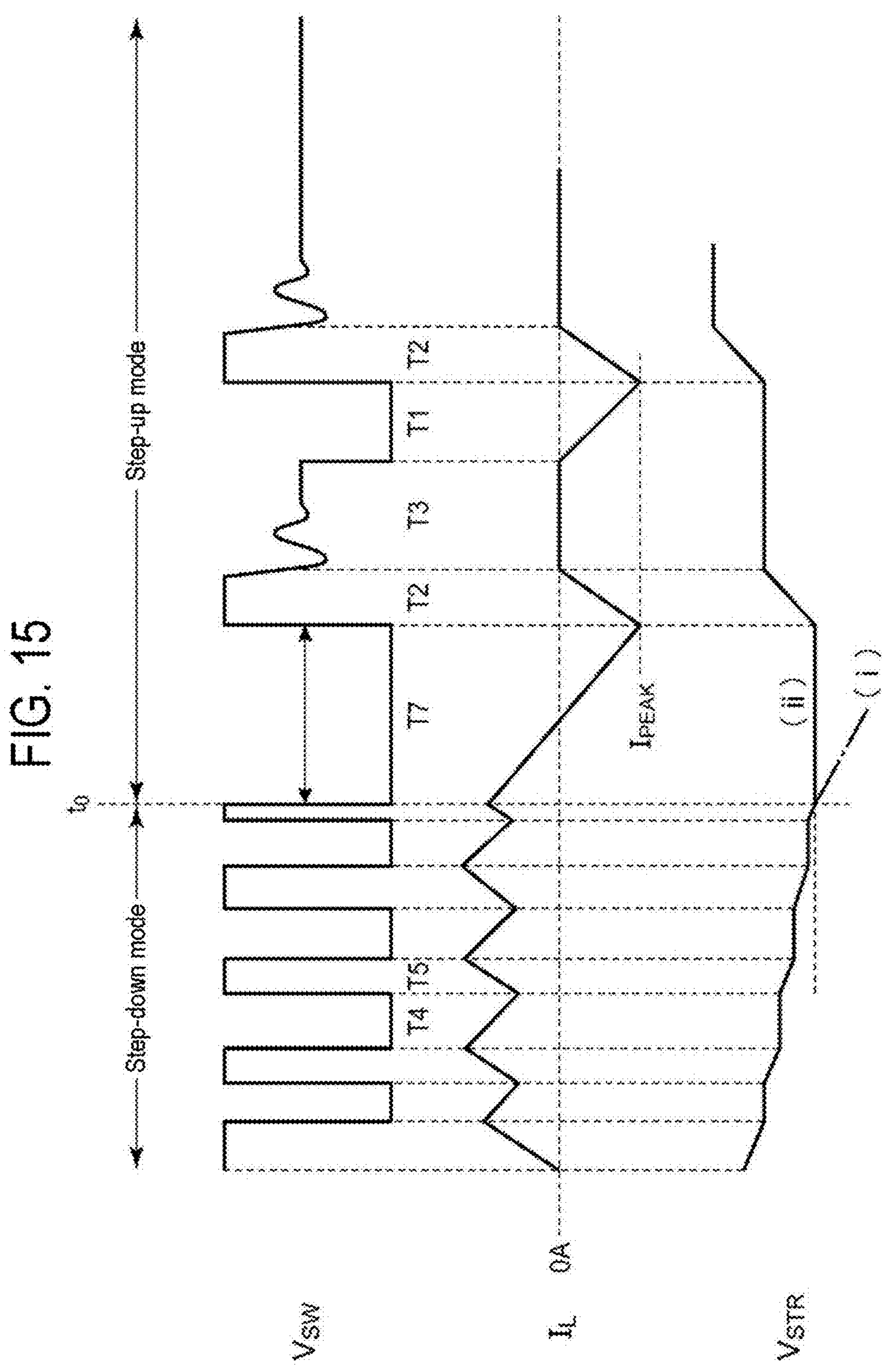
FIG. 15 is a waveform diagram for explaining an operation of the PLP circuit shown in FIG. 14.

FIG. 15 is a waveform diagram for explaining an operation of the PLP circuit 100C shown in FIG. 14.

Before time $t_0$, the PLP circuit 100 is operating in the step-down mode, and the bidirectional converter 230 alternately repeats a period T4 in which the low-side transistor M2 is turned on and the high-side transistor M1 is turned off and a period T5 in which the low-side transistor M2 is turned off and the high-side transistor M1 is turned on.

At time $t_0$, a low-side forced-on signal CTL3 is generated, and immediately after switching to the step-up mode, a low-side forced-on period T7 is inserted. During this low-side forced-on period T7, the low-side transistor M2 is forcibly fixed to an on state, regardless of the control signal CTL1 generated by the feedback circuit 242 in the converter controller 240.

Then, when the coil current $I_L$, commutates and increases to a predetermined peak $I_{PEAK}$, the low-side forced-on period T7 ends. After the low-side forced-on period T7 ends, the bidirectional converter 230 is operated in a PFM mode. A circuit for comparing the coil current $I_L$ with the peak $I_{PEAK}$ is incorporated in the feedback circuit 242, and a signal indicating the result of comparison of the coil current $I_L$, and the peak $I_{PEAK}$ is included in the feedback signal CTL1.

If the low-side forced-on period T7 is not provided, the start of the operation in the step-up mode is delayed under the influence of the delay in the feedback circuit 242. Therefore, the backup capacitor C2 is discharged by the load current, and the capacitor voltage $V_{STR}$ drops as indicated by the one-dot chain line (i).

Further, in the control based on the feedback signal CTL1 generated by the feedback circuit 242, immediately after switching to the step-up mode, the high-side transistor M1 is turned on and the low-side transistor M2 is turned off. Therefore, the backup capacitor C2 is discharged, and the capacitor voltage $V_{STR}$ drops as indicated by the one-dot chain line (i).

By providing the low-side forced-on period T7, the influence of the delay in the feedback circuit 242 can be eliminated, and the step-up operation can be started from the charging cycle of the backup capacitor C2. This makes it possible to suppress the drop in the capacitor voltage $V_{STR}$ as indicated by the solid line (ii).

Applications

Figure 16:
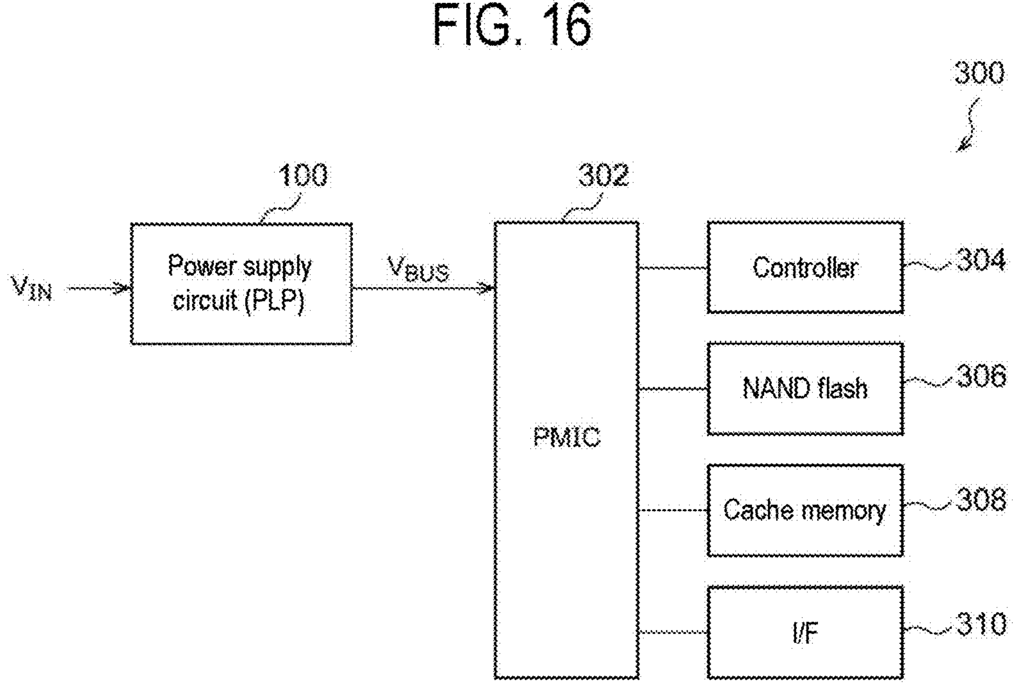
FIG. 16 is a block diagram of a data storage having a PLP function.

The PLP circuits 100, 100A, 100B, and 100C (hereinafter, collectively referred to as 100) according to the embodiments can be used in a data storage 300. FIG. 16 is a block diagram of a data storage 300 having a PLP function. The data storage 300 is, for example, an SSD (Solid State Drive), and includes the PLP circuit 100, a PMIC 302, a controller 304, a NAND memory 306, a cache memory 308, and an interface 310.

The data storage 300 may be used for a server, may be built into a computer, or may be a portable SSD.

The PLP circuit 100 receives a DC input voltage $V_{DC}$ from an AC/DC converter or a USB bus (the above-mentioned power supply 10 not shown in FIG. 16), and supplies a power supply voltage $V_{DD}$ of a predetermined voltage level to the PMIC 302. The PMIC 302 supplies the power supply voltage to the controller 304, the NAND memory 306, the cache memory 308, and the interface 310.

The use of the PLP circuit 100 is not limited to the data storage 300, but may be used in any application where a power supply voltage must be maintained for a certain period of time even after power is cut off.

The embodiments described using specific terms merely illustrate the principles and applications of the present disclosure. Many modifications and changes in arrangement may be made in the embodiments without departing from the spirit of the present disclosure as defined in the claims.

Supplementary Note

The technique disclosed in this specification can be understood in one aspect as follows.

(Item 1)

A power loss protection controller circuit for receiving an input voltage and supplying an output voltage to a load, comprising: a bidirectional converter configured to step up the input voltage and charge a backup capacitor in a step-up mode and configured to step down a voltage of the backup capacitor in a step-down mode to generate the output voltage; and a converter controller configured to operate the bidirectional converter in the step-up mode in a normal state in which the input voltage is higher than a predetermined threshold voltage, and configured to operate the bidirectional converter in the step-down mode in a power loss state in which the input voltage is lower than the threshold voltage, wherein the bidirectional converter includes a bootstrap circuit, a high-side transistor, a low-side transistor, a high-side driver configured to drive the high-side transistor, a low-side driver configured to drive the low-side transistor, and a voltage maintenance circuit provided separately from the bootstrap circuit and configured to maintain a voltage of a bootstrap line of the bidirectional converter at a voltage higher than a switching voltage by a predetermined voltage value, and the converter controller includes a feedback circuit configured to generate a feedback control signal so that the voltage of the backup capacitor approaches a first target level in the step-up mode, and configured to generate a feedback control signal so that the output voltage approaches a second target level in the step-down mode, a logic circuit configured to control the high-side driver and the low-side driver based on the feedback control signal, and a high-side forced-on circuit configured to control the logic circuit to forcibly fix the high-side transistor to an on state during a high-side forced-on period of a predetermined length when switching from the step-up mode to the step-down mode.

(Item 2)

The power loss protection controller circuit of Item 1, wherein the voltage maintenance circuit includes a charge pump circuit.

(Item 3)

The power loss protection controller circuit of Item 1, wherein the voltage maintenance circuit includes a charging circuit configured to charge the bootstrap line based on the voltage of the backup capacitor.

(Item 4)

The power loss protection controller circuit of any one of Items 1 to 3, wherein the converter controller controls the bidirectional converter so that an on-period of the low-side transistor immediately after the high-side forced on-period does not become narrower than a predetermined minimum width.

(Item 5)

The power loss protection controller circuit of any one of Items 1 to 4, wherein the converter controller disables the forced-on of the high-side transistor when a target level of the output voltage of the bidirectional converter in the step-down mode is lower than the threshold voltage.

(Item 6)

The power loss protection controller circuit of Item 5, wherein when the converter controller disables the forced-on of the high-side transistor, the converter controller temporarily shifts the target level of the output voltage of the bidirectional converter to a voltage level higher than a normal level immediately after transitioning to the step-down mode.

(Item 7)

The power loss protection controller circuit of any one of Items 1 to 6, wherein the converter controller has an overcurrent protection function of limiting a current flowing through an inductor of the bidirectional converter so as not to exceed an overcurrent threshold value, and is configured to increase the overcurrent threshold value over time after switching from the step-up mode to the step-down mode.

(Item 8)

The power loss protection controller circuit of any one of Items 1 to 7, wherein the converter controller further includes a low-side forced-on circuit configured to control the logic circuit to forcibly fix the low-side transistor to an on state during a low-side forced-on period of a predetermined length when switching from the step-down mode to the step-up mode.

(Item 9)

The power loss protection controller circuit of Item 8, wherein the converter controller terminates the low-side forced-on period when a coil current commutates and reaches a predetermined peak current.

(Item 10)

The power loss protection controller circuit of any one of Items 1 to 9, wherein the bidirectional converter is operated in a synchronous rectification mode in the step-up mode.

(Item 11)

The power loss protection controller circuit of any one of Items 1 to 9, wherein the bidirectional converter is operated in a diode rectification mode in the step-up mode.

(Item 12)

The power loss protection controller circuit of any one of Items 1 to 11, which is integrated onto a single semiconductor substrate.

(Item 13)

A power loss protection circuit, comprising: a backup capacitor; and the power loss protection controller circuit of any one of Items 1 to 12 connected to the backup capacitor.

(Item 14)

A data storage, comprising: the power loss protection circuit of Item 13.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power loss protection controller circuit for receiving an input voltage and supplying an output voltage to a load, comprising:

- a bidirectional converter configured to step up the input voltage and charge a backup capacitor in a step-up mode, and configured to step down a voltage of the backup capacitor in a step-down mode to generate the output voltage; and
- a converter controller configured to operate the bidirectional converter in the step-up mode in a normal state in which the input voltage is higher than a predetermined threshold voltage, and configured to operate the bidirectional converter in the step-down mode in a power loss state in which the input voltage is lower than the threshold voltage, wherein the bidirectional converter includes:

- a bootstrap circuit;
- a high-side transistor;
- a low-side transistor;
- a high-side driver configured to drive the high-side transistor;
- a low-side driver configured to drive the low-side transistor; and
- a voltage maintenance circuit provided separately from the bootstrap circuit and configured to maintain a voltage of a bootstrap line of the bidirectional converter at a voltage higher than a switching voltage by a predetermined voltage value, and wherein the converter controller includes:

a feedback circuit configured to generate a feedback control signal so that the voltage of the backup capacitor approaches a first target level in the step-up mode, and configured to generate a feedback control signal so that the output voltage approaches a second target level in the step-down mode;

a logic circuit configured to control the high-side driver and the low-side driver based on the feedback control signal; and a high-side forced-on circuit configured to control the logic circuit to forcibly fix the high-side transistor to an on state during a high-side forced-on period of a predetermined length when switching from the step-up mode to the step-down mode.

2. The power loss protection controller circuit of claim 1, wherein the voltage maintenance circuit includes a charge pump circuit.

3. The power loss protection controller circuit of claim 1, wherein the voltage maintenance circuit includes a charging circuit configured to charge the bootstrap line based on the voltage of the backup capacitor.

4. The power loss protection controller circuit of claim 1, wherein the converter controller controls the bidirectional converter so that an on-period of the low-side transistor immediately after the high-side forced-on period does not become narrower than a predetermined minimum width.

5. The power loss protection controller circuit of claim 1, wherein the converter controller disables the forced-on of the high-side transistor when a target level of the output voltage of the bidirectional converter in the step-down mode is lower than the threshold voltage.

6. The power loss protection controller circuit of claim 5, wherein when the converter controller disables the forced-on of the high-side transistor, the converter controller temporarily shifts the target level of the output voltage of the bidirectional converter to a voltage level higher than a normal level immediately after transitioning to the step-down mode.

7. The power loss protection controller circuit of claim 1, wherein the converter controller has an overcurrent protection function of limiting a current flowing through an inductor of the bidirectional converter so as not to exceed an overcurrent threshold value, and is configured to increase the overcurrent threshold value over time after switching from the step-up mode to the step-down mode.

8. The power loss protection controller circuit of claim 1, wherein the converter controller further includes a low-side forced-on circuit configured to control the logic circuit to forcibly fix the low-side transistor to an on state during a low-side forced-on period of a predetermined length when switching from the step-down mode to the step-up mode.

9. The power loss protection controller circuit of claim 8, wherein the converter controller terminates the low-side forced-on period when a coil current commutates and reaches a predetermined peak current.

10. The power loss protection controller circuit of claim 1, wherein the bidirectional converter is operated in a synchronous rectification mode in the step-up mode.

11. The power loss protection controller circuit of claim 1, wherein the bidirectional converter is operated in a diode rectification mode in the step-up mode.

12. The power loss protection controller circuit of claim 1, which is integrated onto a single semiconductor substrate.

13. A data storage, comprising: the power loss protection circuit of claim 1.

* * * * *